United States Patent
Nakamura et al.

(10) Patent No.: US 8,591,075 B2
(45) Date of Patent: Nov. 26, 2013

(54) OPTICAL MEMBER AND ILLUMINATION APPARATUS USING SAME

(75) Inventors: Kyohei Nakamura, Joyo (JP); Tadashi Murakami, Hirakata (JP); Hiroyuki Sekii, Higashiosaka (JP)

(73) Assignee: Panasonic Corporation, Osaka (JP)

( * ) Notice: Subject to any disclaimer, the term of this patent is extended or adjusted under 35 U.S.C. 154(b) by 77 days.

(21) Appl. No.: 13/357,642

(22) Filed: Jan. 25, 2012

(65) Prior Publication Data
US 2012/0212965 A1   Aug. 23, 2012

(30) Foreign Application Priority Data
Feb. 22, 2011   (JP) .................................. 2011-035738

(51) Int. Cl.
*F21V 5/04*   (2006.01)

(52) U.S. Cl.
USPC .................... 362/311.09; 362/332; 362/296.1

(58) Field of Classification Search
None
See application file for complete search history.

(56) References Cited

U.S. PATENT DOCUMENTS

| 5,683,175 | A | * | 11/1997 | Golz | 362/338 |
| 8,100,540 | B2 | * | 1/2012 | Huebner | 353/94 |
| 2011/0235336 | A1 | * | 9/2011 | Fritsch et al. | 362/307 |
| 2011/0317414 | A1 | * | 12/2011 | Marfeld et al. | 362/235 |

FOREIGN PATENT DOCUMENTS

| CN | 201547690 U | 8/2010 |
| CN | 201706324 U | 1/2011 |
| DE | 10 2008 060969 | 6/2010 |
| EP | 0 598 546 | 5/1994 |
| EP | 2 276 076 | 1/2011 |
| JP | 2009-76343 | 4/2009 |

OTHER PUBLICATIONS

Office Action dated Jun. 20, 2013 issued in corresponding Chinese application No. 2012-10017990.0.

* cited by examiner

*Primary Examiner* — Ashok Patel
(74) *Attorney, Agent, or Firm* — Bacon & Thomas, PLLC

(57) ABSTRACT

An optical member for refracting light emitted from a light source and projecting the light from a light projecting surface thereof includes a plurality of concave or convex portions formed on the light projecting surface. The concave or convex portions are concentrically arranged on a plurality of circles having a common center point. The concave or convex portions on the circles adjoining to each other are arranged in different phase positions with respect to radial lines extending from the center point.

5 Claims, 7 Drawing Sheets

OPTICAL MEMBER AND ILLUMINATION APPARATUS USING SAME

FIELD OF THE INVENTION

The present invention relates to an optical member for refracting the light, which is emitted from a light source such as a light emitting diode (LED) or the like, through the use of a reflecting plate or a lens and projecting the light from a light projecting surface, and an illumination apparatus using the optical member.

BACKGROUND OF THE INVENTION

In a conventional illumination apparatus, it is sometimes the case that the light is not uniformly projected from a light projecting surface, thereby generating illuminance unevenness or color unevenness which leads to a failure to make the illuminance of an irradiated surface uniform. Various kinds of devices and methods are used in an effort to reduce the illuminance unevenness.

For example, there is known a method of reducing illuminance unevenness or color unevenness on an irradiated surface by providing dimple-shaped concave portions 7a on a light projecting surface of an optical member of an illumination apparatus as shown in FIG. 7A. The concave portions 7a are of a regular hexagonal shape and are arranged in a honeycomb structure with no clearance left therebetween. Using the honeycomb structure, light dimming regions differing in transmittance are formed so that the light beams can interfere with one another. The illuminance unevenness on an irradiated surface is reduced while maintaining the transmittance of the light beams.

In order to reduce generation of illuminance unevenness in an illumination apparatus, there is disclosed an illumination apparatus including a molded body for a light source cover which is resistant to resin degradation and capable of realizing a light-irradiated surface with reduced brightness unevenness and enhanced brightness uniformity (see, e.g., Japanese Patent Application Patent No. 2009-76343).

However, even if the illumination apparatus employs the conventional optical member 7 in which the concave portions 7a are arranged on the light projecting surface in a honeycomb structure, a problem is posed in that illuminance unevenness is generated on the irradiated surface 8 as illustrated in FIG. 7B.

SUMMARY OF THE INVENTION

In view of the above, the present invention provides an optical member capable of reducing illuminance unevenness or color unevenness which may cause an irradiated surface to look unattractive and eventually making the irradiated surface look nice, and an illumination apparatus using the optical member.

In accordance with one aspect of the present invention, there is provided an optical member for refracting light emitted from a light source and projecting the light from a light projecting surface thereof, including: a plurality of concave or convex portions formed on the light projecting surface, the concave or convex portions being concentrically arranged on a plurality of circles having a common center point, and the concave or convex portions on the circles adjoining to each other being arranged in different phase positions with respect to radial lines extending from the center point.

Preferably, the circles may be arranged at an equal interval.

The light source may be arranged at the opposite side of the optical member from the light projecting surface, the depth or height of the concave or convex portions growing larger as the position thereof gets closer to the light source.

It is preferred that the concave or convex portions may have center coordinates (x, y) arranged to satisfy equations (1) through (5):

(1) $0 < D_{n+1} - D_n \leq 2 \cdot d$, where d is the radius of the concave or convex portions seen in a plan view, n is the order of the circles counted from the center point, and $D_n$ is the radius of the n-th circle counted from the center point;

(2) $0 < k_n < 2 \cdot D_n \cdot \pi / d$, where $k_n$ is the number of the concave or convex portions existing on the n-th circle counted from the center point (an integer);

(3) $\theta_n = 360°/k_n$, where $\theta_n$ is the angle between the centers of the concave or convex portions adjoining to each other;

(4) $x = D_n \cdot \cos(\theta_n \cdot A_m + b_n)$, where $A_m$ is an arithmetic progression in which a first term is 1, a common difference being 1 and the last term being $k_n$, and $b_n$ is the phase of the center of each of the concave or convex portions; and (5) $y = D_n \cdot \sin(\theta_n \cdot A_m + b_n)$.

The concave or convex portions may have center coordinates (x, y) arranged to satisfy equations (6) through (8):

(6) $\theta_n = 360°/(6 \cdot n)$, where n is the order of the circles counted from the center point, and $\theta_n$ is the angle between the centers of the concave or convex portions adjoining to each other;

(7) $x = \sqrt{3} \cdot d \cdot n \cdot \cos(\theta_n \cdot k_m + b_n)$, where d is the radius of the concave or convex portions seen in a plan view, $b_n$ is the phase of the center of each of the concave or convex portions (the phase conforming to one of the Fibonacci sequence, the Tribonacci sequence, the Tetranacci sequence, the Lucas sequence and the uniformly distributed random number), and $k_m$ is an arithmetic progression in which a first term is 1, a common difference being 1 and the last term being $6 \cdot n$; and (8) $y = \sqrt{3} \cdot d \cdot n \cdot \sin(\theta_n \cdot k_m + b_n)$.

In accordance with another aspect of the present invention, there is provided an illumination apparatus including the optical member described in the one aspect of the present invention.

With the optical member and the illumination apparatus in accordance with the present invention, the concave or convex portions formed on the light projecting surface are concentrically arranged on a plurality of circles having a common center point, the concave or convex portions on the circles adjoining to each other being arranged in different phase positions with respect to radial lines extending from the center point. Thanks to this feature, it is possible to refract the light passing through the optical member in a specified direction and to reduce generation of illuminance unevenness or color unevenness which may cause an irradiated surface to look unattractive.

DETAILED DESCRIPTION OF THE PREFERRED EMBODIMENTS

Optical members and illumination apparatuses in accordance with embodiments of the present invention will now be described with reference to the accompanying drawings which form a part hereof.

First Embodiment

Figure 1A:
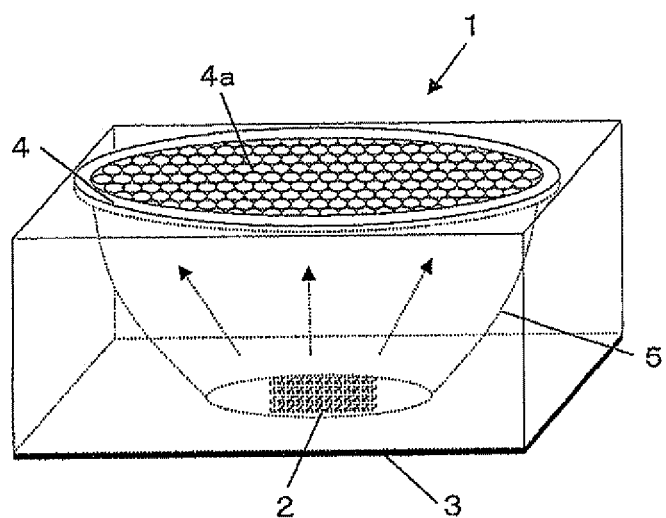
FIG. 1A is a perspective view showing an illumination apparatus according to a first embodiment of the present invention.
Figure 1B:
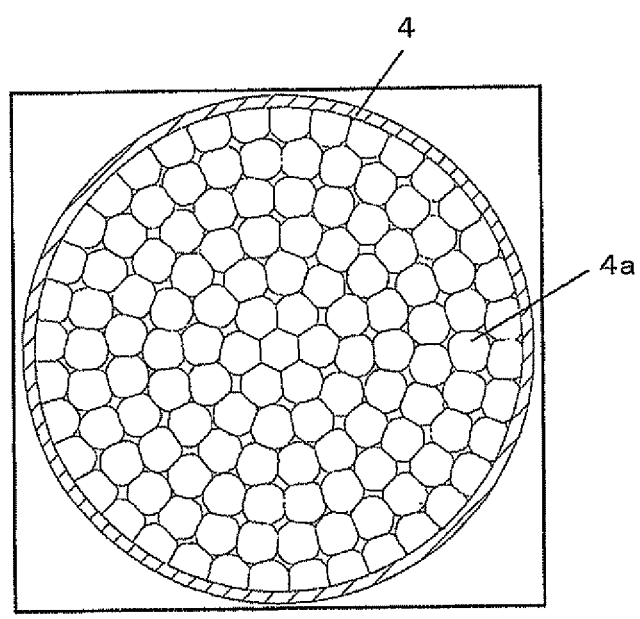
FIG. 1B is a plan view of the illumination apparatus as seen at the side of a light projecting surface.
Figure 2A:
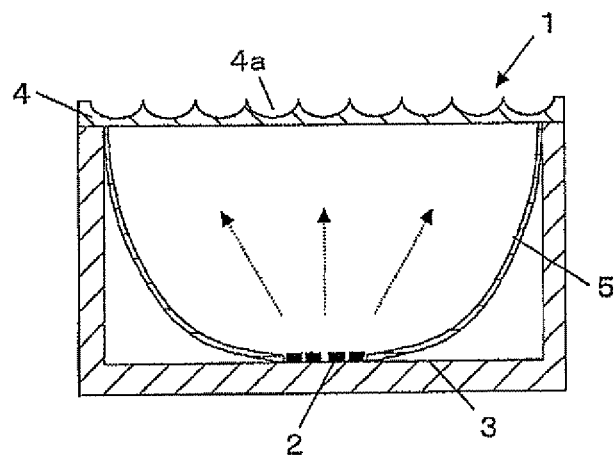
FIG. 2A is a section view of the illumination apparatus.

Referring to FIGS. 1 and 2, the illumination apparatus in accordance with a first embodiment of the present invention includes a light source 2 for emitting light, a substrate 3 on which the light source 2 is mounted, an optical member 4 for refracting the light emitted from the light source 2 and irradiating the light in a specified direction, and a reflecting mirror 5.

Used as the light source 2 is, e.g., a high-power white light emitting diode formed by combining a blue light emitting diode chip and a phosphor for converting the light of blue wavelength band having a peak wavelength of about 470 nm to the light of white wavelength band. As the phosphor combined with the blue light emitting diode chip to form the white light emitting diode, it is possible to use, e.g., a yellow phosphor, a combination of a yellow phosphor and a red phosphor or a combination of a green phosphor and a red phosphor. Examples of a phosphor material includes a YAG (yttrium-aluminum-garnet)-based material, a TAG (terbium-aluminum-garnet)-based material and a sialon-based material. The white light emitting diode is formed by mixing the phosphor with a resin material and covering the blue light emitting diode chip with the mixture.

The shape of a light emitting surface of the light source 2 is not particularly limited. For example, a plurality of packages composed of a light emitting diode chip and a phosphor material is two-dimensionally arranged on the substrate 3, e.g., a printed substrate (or a heat-radiating substrate). The light source 2 is not limited to the white light emitting diode but may be a small-size incandescent lamp or a small-size halogen lamp.

The substrate 3 is a general-purpose printed substrate. A substrate having superior dimensional stability and reduced deviation in warp and distortion is used as the substrate 3. For example, a glass epoxy substrate formed by superimposing glass clothes (fabrics) and impregnating the glass clothes with an epoxy resin is used as the material of the substrate 3. The substrate 3 is not particularly limited as long as it can be used at a required heat-resistant temperature. In order to efficiently dissipate the heat generated from the light source 2, heat sinks or radiator fins made of a material with good heat dissipation capability, e.g., copper, are attached to the backside of the substrate 3. A pedestal (not shown) is arranged on the substrate 3 to maintain the positional relationship between the light source 2 and the reflecting mirror 5, thereby obtaining light distribution as designed.

The optical member 4 is arranged on the light projecting surface of the illumination apparatus 1 independently of the reflecting mirror 5. The optical member 4 refracts the light emitted from the light source 2 in a desired direction and projects the light from the light projecting surface. A plurality of concave portions 4a (dimple-shaped depressions) having a circular shape when seen in a plan view is concentrically arranged on the light projecting surface of the optical member 4. The plan-view shape of the concave portions 4a is not limited to the circular shape but may be a polygonal shape or other shapes. While the concave portions 4a are taken as an example in the present embodiment, convex portions may be provided in place of the concave portions 4a.

The reflecting mirror 5 is an optical component of, e.g., semi-ellipsoid shape, for reflecting the light emitted from the light source 2 and projecting the light from the light projecting surface. The reflecting mirror 5 can be effectively used in case where the light emitting surface of the light source 2 is a perfect diffusion surface and the light emitted from the light source 2 is partially directed toward the substrate 3.

Next, description will be made on the arrangement of the concave portions 4a formed on the light projecting surface of the optical member 4 in accordance with the present embodiment.

Figure 2B:
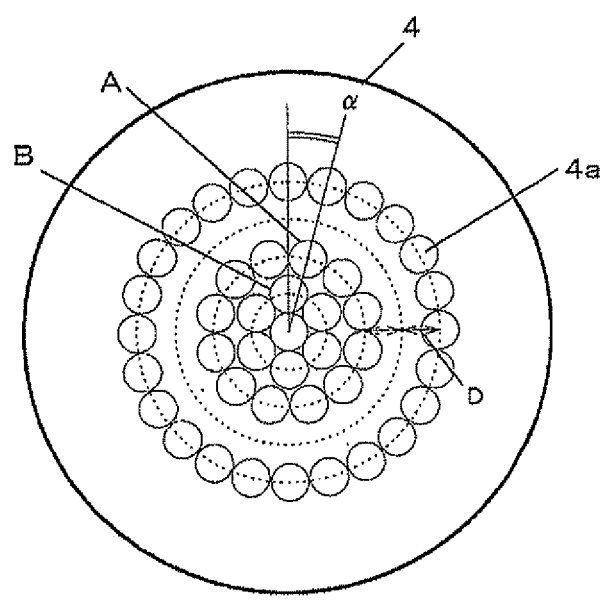
FIG. 2B is a view explaining the arrangement of concave portions formed on the light projecting surface of an optical member according to the first embodiment.

As shown in FIG. 1B or 2B, the concave portions 4a formed on the light projecting surface of the optical member are concentrically arranged on a plurality of circles having a common center point. The concave portions 4a on the circles adjoining to each other are arranged in different phase positions with respect to radial lines extending from the center point (For example, a phase difference a is generated between the concave portion A and the concave portion B as illustrated in FIG. 2B). As can be seen in FIG. 2B, the circles on which the center coordinates of the concave portions 4a lie are arranged at an equal interval D.

Figure 3:
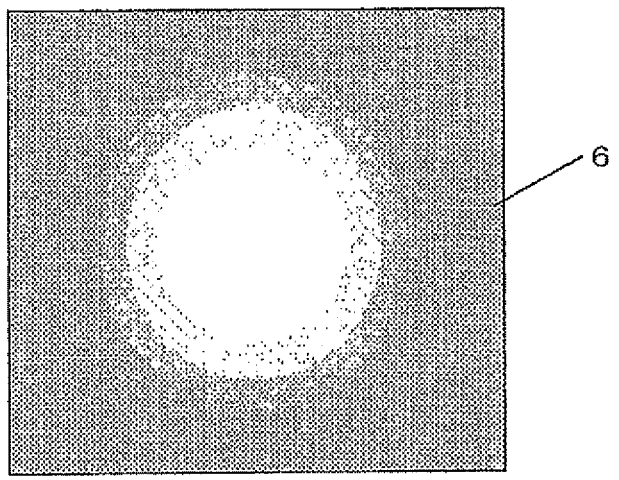
FIG. 3 is a view illustrating one example of the irradiated surface of the illumination apparatus.
Figure 7A:
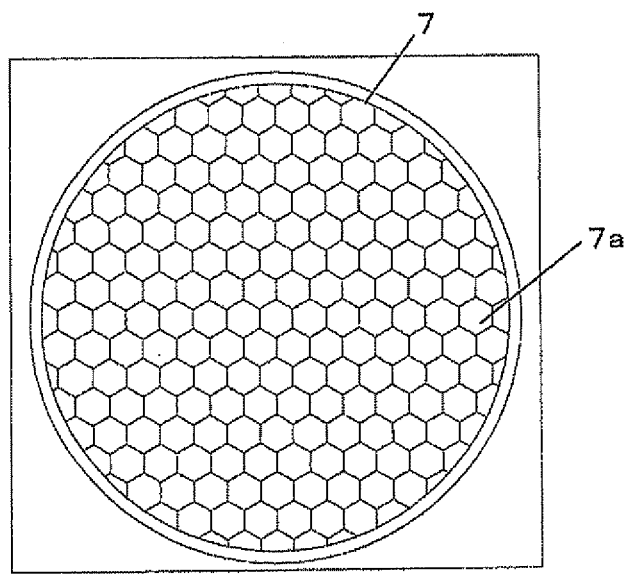
FIG. 7A is a plan view showing a conventional optical member having dimple-shaped concave portions.
Figure 7B:
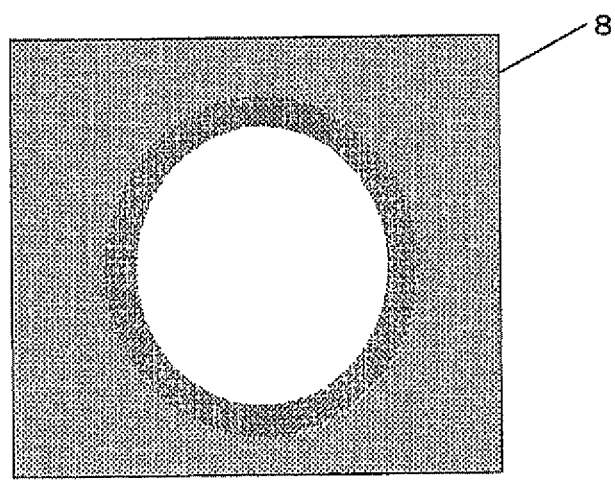
FIG. 7B is a view illustrating one example of an irradiated surface of a conventional illumination apparatus.

FIG. 3 illustrates an irradiated surface 6 on which the light is irradiated by the illumination apparatus 1 in accordance with the present embodiment. It can be appreciated that, as compared with the conventional irradiated surface 8 shown in FIG. 7B, the illuminance unevenness is reduced in the irradiated surface 6.

In the illumination apparatus 1 described above, the concave portions 4a formed on the light projecting surface of the optical member 4 are concentrically arranged on a plurality of circles having a common center point. The concave portions 4a on the circles adjoining to each other are arranged in different phase positions with respect to radial lines extending from the center point. Therefore, as compared with the conventional optical member 7 in which the concave portions 7a are arranged in a honeycomb pattern, the illuminance unevenness is reduced while the effect of reducing the color unevenness is kept. This makes it possible to improve the outward appearance of the irradiated surface 6. Since the circles on which the center coordinates of the concave portions 4a lie are arranged at an equal interval D, it is possible to facilitate the design of the optical member 4.

Figure 4A:
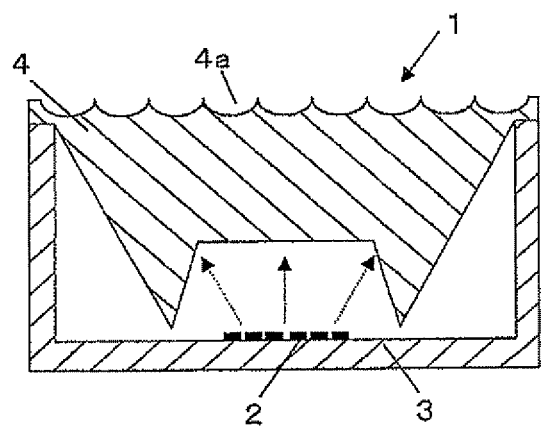
FIG. 4A is a section view of an illumination apparatus employing an optical member having a different shape.
Figure 4B:
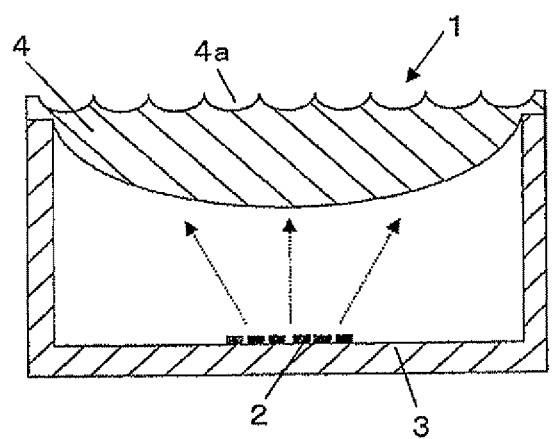
FIG. 4B is a section view of an illumination apparatus employing an optical member having another different shape.

As shown in FIGS. 4A and 4B, it is sometimes the case that a lens is used as the optical member 4 instead of providing the reflecting mirror 5. The lens 4 shown in FIG. 4A is formed of, e.g., a solid of revolution having a large top surface and a small bottom surface whose axis is normal to the substrate 3. The small bottom surface is provided with a recessed surface serving as an incident surface on which the light emitted from the light source 2 is incident. The lens 4 refracts the incident light and projects the refracted light from the light projecting surface. Concave portions 4a are formed on the large top surface to avoid generation of illuminance unevenness on an irradiated surface. The lens 4 shown in FIG. 4B has a substantially hemispherical shape and includes concave portions 4a formed on the light projecting surface thereof. A transparent material such as acryl resin, polycarbonate resin or glass is used as the material of the optical member (lens) 4.

First Modified Example

Figure 5A:
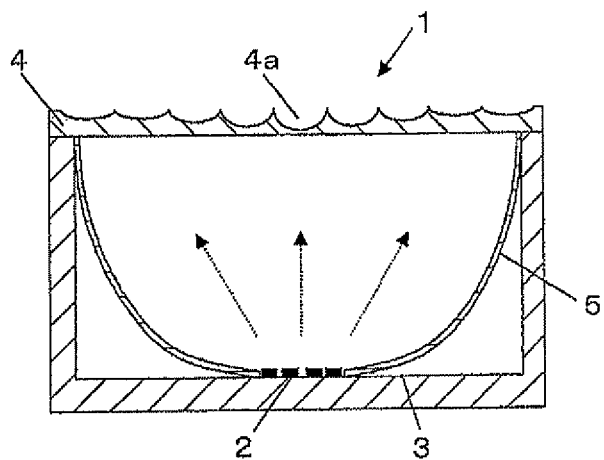
FIGS. 5A and 5B are section views showing modified examples of the illumination apparatus.
Figure 5B:
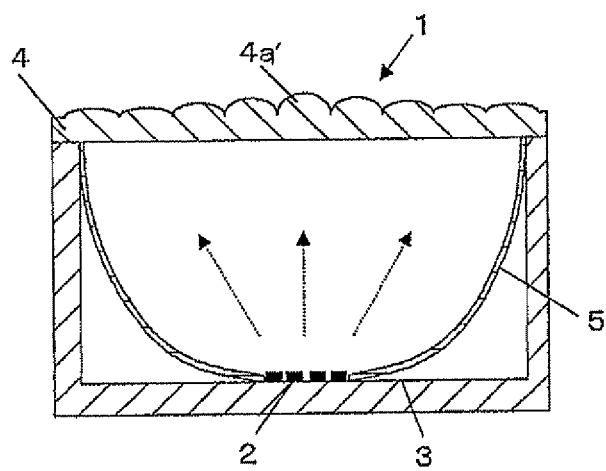

A first modified example of the first embodiment will now be described with reference to FIGS. 5A and 5B. In the present modified example, the optical member 4 of the illumination apparatus 1 shown in FIG. 5A includes a plurality of concave portions 4a, the depth of which grows larger as the position thereof gets closer to the light source 2 arranged at the opposite side of the optical member 4 from the light projecting surface. The optical member 4 of the illumination apparatus 1 shown in FIG. 5B includes a plurality of convex portions 4a', the height of which grows larger as the position thereof gets closer to the light source 2. As the depth of the concave portions 4a or the height of the convex portions 4a' is increased, the optical member 4 becomes easy to diffuse the light and has lower light transmittance. While the adjoining concave portions 4a or the adjoining convex portions 4a' differ in depth or height from each other in the illumination apparatuses 1 shown in FIGS. 5A and 5B, it is thinkable to change the depth of the concave portions 4a or the height of the convex portions 4a' in a specified pattern.

In the illumination apparatuses 1 in accordance with the present modified example, the depth of the concave portions 4a grows larger as the position thereof gets closer to the light source 2 and the height of the convex portions 4a' grows larger as the position thereof gets closer to the light source 2. This makes it possible to increase the light diffusivity in the portion of the optical member 4 nearer to the light source 2 where illuminance unevenness or color unevenness is apt to occur. Further, it is possible to reduce the light diffusivity in the portion of the optical member 4 farther from the light source 2 where illuminance unevenness or color unevenness hardly occurs. As a result, it is possible to reduce generation of illuminance unevenness or color unevenness on an irradiated surface and to minimize reduction of the light emitting efficiency caused by the concave portions 4a or the convex portions 4a'.

Second Embodiment

An illumination apparatus in accordance with a second embodiment of the present invention will now be described with reference to FIGS. 6A through 6D. The same components as those of the illumination apparatus 1 of the first embodiment will be designated by like reference symbols and will not be described in detail (which holds true in the following description).

Figure 6A:
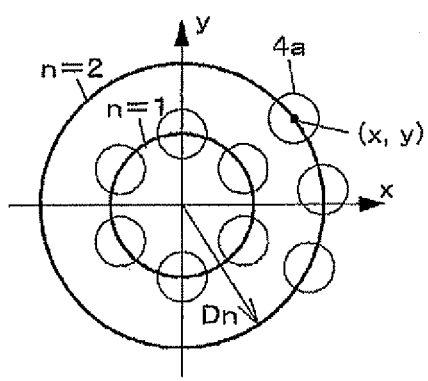
FIG. 6A is a view explaining terms n and Dn used in equations for finding center coordinates (x, y) of concave or convex portions of the illumination apparatuss according to second and third embodiments of the present invention.
Figure 6B:
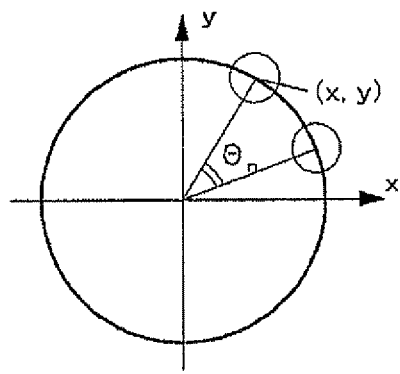
FIG. 6B is a view explaining a term θn used in the equations.
Figure 6C:
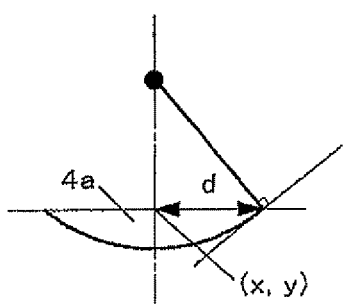
FIGS. 6C and 6D are views explaining a term d used in the equations.
Figure 6D:
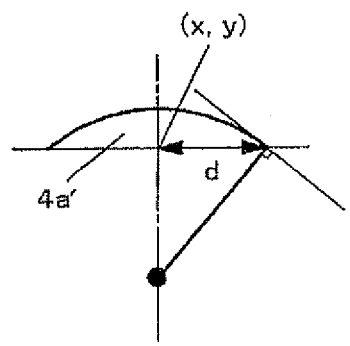

In the illumination apparatus 1 in accordance with the second embodiment, the center coordinates (x, y) of the concave or convex portions 4a or 4a' is set to satisfy equations (1) through (5):

(1) $0 < D_{n+1} - D_n \leq 2 \cdot d$, where d is the radius of the concave or convex portions 4a or 4a' seen in a plan view (see FIGS. 6C and 6D), n is the order of the circles counted from the center point (see FIG. 6A), and $D_n$ is the radius of the n-th circle counted from the center point;

(2) $0 < k_n < 2 \cdot D_n \cdot \pi / d$, where $k_n$ is the number of the concave or convex portions existing on the n-th circle counted from the center point (an integer);

(3) $\theta_n = 360°/k_n$, where $\theta_n$ is the angle between the centers of the concave or convex portions adjoining to each other (see FIG. 6B);

(4) $x = D_n \cdot \cos(\theta_n \cdot A_m + b_n)$, where $A_m$ is an arithmetic progression in which a first term is 1, a common difference being 1 and the last term being $k_n$, and $b_n$ is the phase of the center of each of the concave or convex portions; and (5) $y = D_n \cdot \sin(\theta_n \cdot A_m + b_n)$.

In the illumination apparatus 1 of the second embodiment, the arrangement of the center coordinates of the concave or convex portions 4a or 4a' can be easily calculated through the use of equations (1) through (5), which makes it possible to facilitate a design work. As in the first embodiment, the concave or convex portions 4a or 4a' can be concentrically arranged on a plurality of circles having a common center point. The concave or convex portions 4a or 4a' on the circles adjoining to each other can be arranged in different phase positions with respect to radial lines extending from the center point. It is therefore possible to reduce generation of illuminance unevenness.

Third Embodiment

An illumination apparatus in accordance with a third embodiment of the present invention will now be described with reference to FIGS. 6A through 6D which are used in describing the second embodiment. In the illumination apparatus 1 in accordance with the third embodiment, the center coordinates (x, y) of the concave or convex portions 4a or 4a' is set to satisfy equations (6) through (8):

(6) $\theta_n = 360°/(6 \cdot n)$, where n is the order of the circles counted from the center point (see FIG. 6A), and $\theta_n$ is the angle between the centers of the concave or convex portions adjoining to each other (see FIG. 6B);

(7) $x = \sqrt{3} d \cdot n \cdot \cos(\theta_n \cdot k_m + b_n)$, where d is the radius of the concave or convex portions seen in a plan view (see FIGS. 6C and 6D), $b_n$ is the phase of the center of each of the concave or convex portions (the phase conforming to one of the Fibonacci sequence, the Tribonacci sequence, the Tetranacci sequence, the Lucas sequence and the uniformly distributed random number, which are described later), and $k_m$ is an arithmetic progression in which a first term is 1, a common difference being 1 and the last term being $6 \cdot n$; and (8) $y = \sqrt{3} d \cdot n \cdot \sin(\theta_n \cdot k_m + b_n)$.

Now, description will be made on the Fibonacci sequence. The n-th Fibonacci number ($F_n$) is represented by equation (9):

(9) $F_{n+2} = F_n + F_{n+1}$ ($n \geq 0$), where $F_0$ is 0 and $F_1$ is 1.

The Fibonacci sequence is defined as a recurrence relation having two initial conditions, in which each term is equal to the sum of two preceding terms. For example, some of the first and following terms in the Fibonacci sequence are 0, 1, 1, 2, 3, 5, 8, 13, 21, 34, 55 and 89. The Fibonacci numbers often appear in the natural phenomena. For instance, it is not infrequent that the number of flower petals is the Fibonacci number. The phyllotaxy (the manner of attachment of leaves in a plant) is associated with the Fibonacci number.

Next, description will be made on the Tribonacci sequence. The n-th Tribonacci number ($F_n$) is represented by equation (10):

(10) $F_{n+3} = F_n + F_{n+1} + F_{n+2}$ ($n \geq 0$), where $F_0$ and $F_1$ are 0 and $F_2$ is 1.

In the Fibonacci sequence, each term is equal to the sum of two preceding terms. In contrast, each term is equal to the sum of three preceding terms in the Tribonacci sequence. For example, some of the first and following terms in the Tribonacci sequence are 0, 1, 1, 2, 4, 7, 13, 24, 44, 81, 149, 274 and 504.

Next, description will be made on the Tetranacci sequence. The n-th Tetranacci number (Fn) is represented by equation (11):

(11) Fn+4=Fn+Fn+1+Fn+2+Fn+3(n≥0), where F0, F1 and F2 are 0 and F3 is 1.

In the Tetranacci sequence, each term is equal to the sum of four preceding terms. For example, some of the first and following terms in the Tetranacci sequence are 0, 0, 0, 1, 1, 2, 4, 8, 15, 29, 56, 108, 208 and 401. The terms of a sequence obtained by replacing the first two terms of the Fibonacci sequence with 2 and 1 are called the Lucas sequence. The general term of the Lucas sequence is represented by equation (12):

(12) Ln=((1+√5)/2)n+((1−√5)/2)n.

The uniformly distributed random number stated above refers to a random number in which the appearance probabilities of all the values are equal to each other.

In the illumination apparatus 1 in accordance with the third embodiment, just like the second embodiment, the center coordinates of the concave or convex portions 4a or 4a' are set based on equations (6) through (12). This makes it possible to reduce generation of illuminance unevenness and to facilitate a design work.

The present invention is not limited to the configurations of the foregoing embodiments but may be modified in many different forms without departing from the scope and spirit of the invention. For example, the optical member 4 may be applied to not only the illumination apparatus 1 but also other optical devices.

What is claimed is:

1. An optical member for refracting light emitted from a light source and projecting the light from a light projecting surface thereof, comprising:
   a plurality of concave or convex portions formed on the light projecting surface, the concave or convex portions being concentrically arranged on a plurality of circles having a common center point, and the concave or convex portions on the circles adjoining to each other being arranged in different phase positions with respect to radial lines extending from the center point,
   wherein the light source is arranged at the opposite side of the optical member from the light projecting surface, the depth or height of the concave or convex portions growing larger as the position thereof gets closer to the light source.

2. The optical member of claim 1, wherein the circles are arranged at an equal interval.

3. The optical member of claim 1, wherein the concave or convex portions have center coordinates (x, y) arranged to satisfy equations (1) through (5):
   (1) $0 < D_{n+1} - D_n \leq 2 \cdot d$, where d is the radius of the concave or convex portions seen in a plan view, n is the order of the circles counted from the center point, and $D_n$ is the radius of the n-th circle counted from the center point;
   (2) $0 < k_n < 2 \cdot D_n \cdot \pi / d$, where $k_n$ is the number of the concave or convex portions existing on the n-th circle counted from the center point (an integer);
   (3) $\theta_n = 360°/k_n$, where $\theta_n$ is the angle between the centers of the concave or convex portions adjoining to each other;
   (4) $x = D_n \cdot \cos(\theta_n \cdot A_m + b_n)$, where $A_m$ is an arithmetic progression in which a first term is 1, a common difference being 1 and the last term being $k_n$, and $b_n$ is the phase of the center of each of the concave or convex portions; and
   (5) $y = D_n \cdot \sin(\theta_n \cdot A_m + b_n)$.

4. The optical member of claim 1, wherein the concave or convex portions have center coordinates (x, y) arranged to satisfy equations (6) through (8):
   (6) $\theta_n = 360°/(6 \cdot n)$, where n is the order of the circles counted from the center point, and $\theta_n$ is the angle between the centers of the concave or convex portions adjoining to each other;
   (7) $x = \sqrt{3} d \cdot n \cdot \cos(\theta_n \cdot k_m + b_n)$, where d is the radius of the concave or convex portions seen in a plan view, $b_n$ is the phase of the center of each of the concave or convex portions (the phase conforming to one of the Fibonacci sequence, the Tribonacci sequence, the Tetranacci sequence, the Lucas sequence and the uniformly distributed random number), and $k_m$ is an arithmetic progression in which a first term is 1, a common difference being 1 and the last term being $6 \cdot n$; and
   (8) $y = \sqrt{3} d \cdot n \cdot \sin(\theta_n \cdot k_m + b_n)$.

5. An illumination apparatus comprising the optical member of claim 1.

* * * * *